March 9, 1937.  C. A. KLENK ET AL  2,073,309
ACCESSORY FOR MECHANICAL REFRIGERATORS
Filed July 11, 1936  2 Sheets-Sheet 1
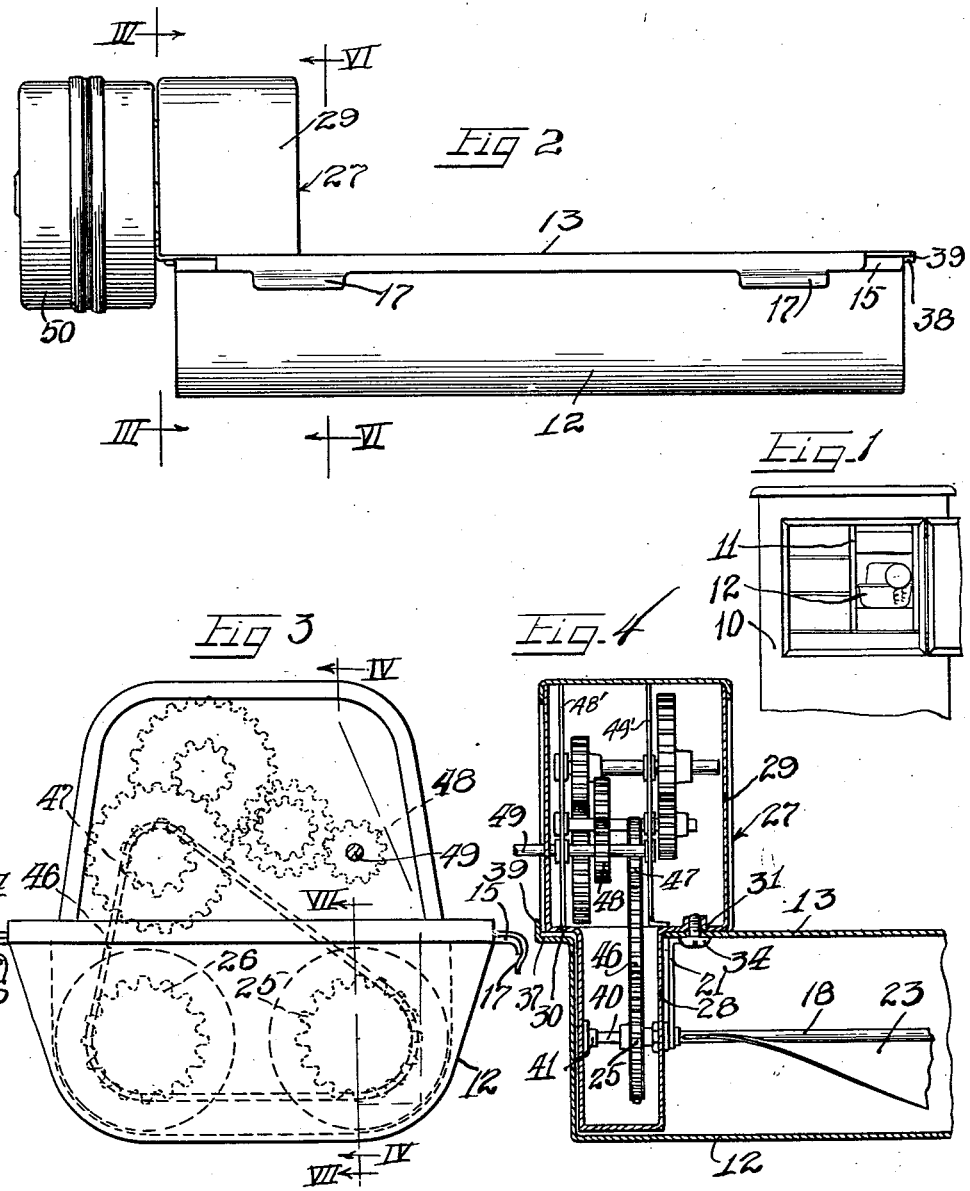
Inventors
Carl A. Klenk.
Bessie S. French.

March 9, 1937.  C. A. KLENK ET AL  2,073,309
ACCESSORY FOR MECHANICAL REFRIGERATORS
Filed July 11, 1936  2 Sheets-Sheet 2
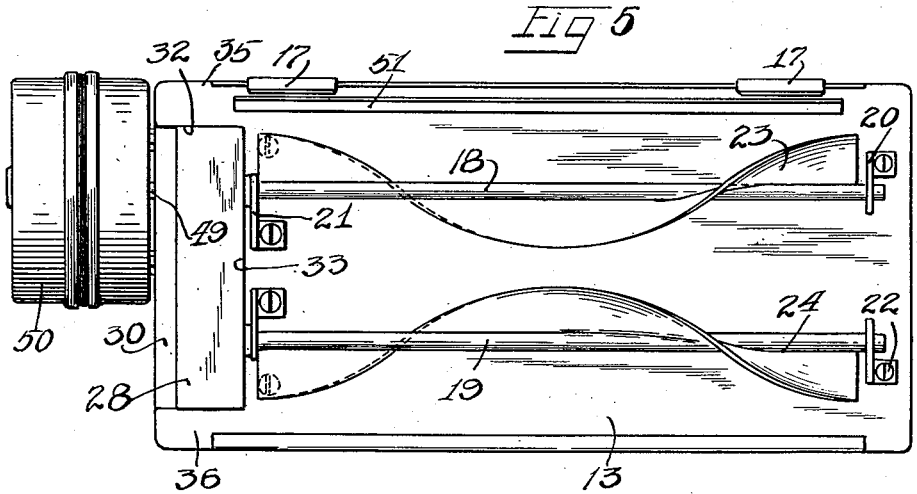
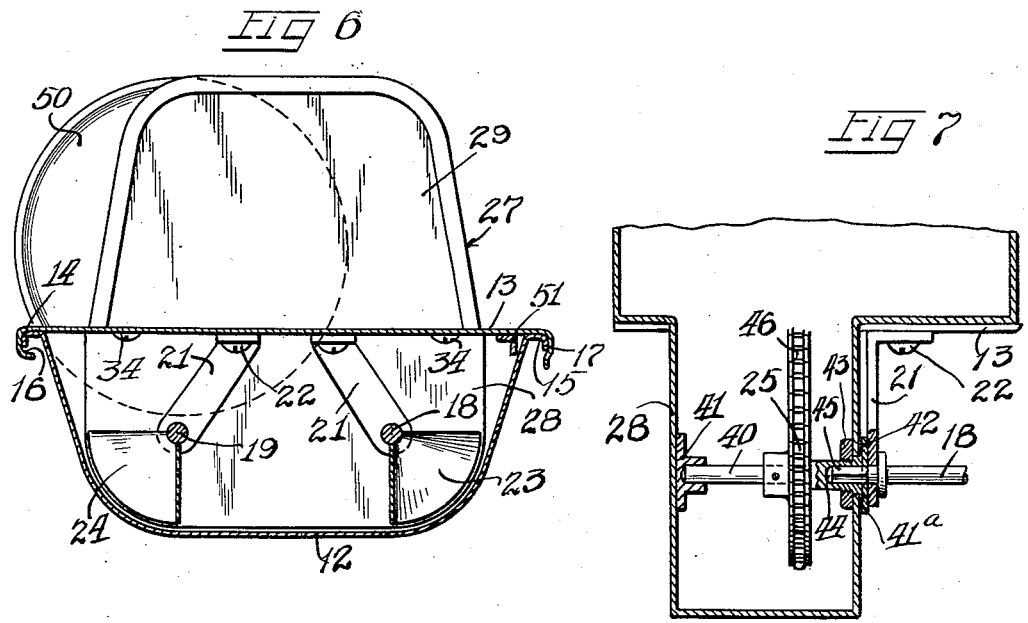
Inventors
Carl A. Klenk
Bessie S. French
by Charles W. Hills Attys Patented Mar. 9, 1937

2,073,309

UNITED STATES PATENT OFFICE 2,073,309

ACCESSORY FOR MECHANICAL REFRIGERATORS

Carl A. Klenk and Bessie S. French, Chicago, Ill.

Application July 11, 1936, Serial No. 90,094

3 Claims. (Cl. 259—104)

The present invention relates in general to an accessory for a mechanical refrigerator, and more specifically is concerned with an improved device to be used with the usual freezing pan of a mechanical refrigerator, whereby the contents of the pan may be agitated and stirred during the freezing operation to prevent crystallization of the liquid being frozen.

There have been more or less complicated devices for this purpose, but these devices have in the main been unsatisfactory. Some of these devices have been hand operated, in which case they are unsatisfactory, in that they necessitated opening of the refrigerator door at frequent intervals, and were thus very inconvenient.

Moreover, other arrangements have been motor driven, but these have in general, due to their construction, required the use of special freezing pans and were otherwise inconvenient to use and operate.

In the present invention, it is sought to provide a motor driven device of the herein described type which may be used with the standard freezing pan, such as ordinarily furnished with the refrigerator, so that when the pan is not thus being used, it may be used for its ordinary purpose of freezing ice cubes.

Another object is to provide an arrangement wherein the driving motor, cover and agitator are formed as a unit which can be readily and easily attached to and detached from an ice pan or freezing tray of a mechanical refrigerator.

A further object is to provide such a device in which the motor and agitating mechanism do not project below the bottom of the freezing pan, so as to enable supporting the pan and connected device on a flat surface.

A further object is to provide novel means whereby the cover and agitator may be disconnected as a unit from the motor and driving connections, so as to enable cleaning these parts without subjecting the motor and its connections to abnormal moisture conditions, while washing, which might cause damage to its windings.

Still another object is to provide a device of the herein described type in which the center of gravity of the unit embodying the motor, agitator and connections will fall within the freezing pan periphery and will not have a tendency to tilt or tip the pan either when it is empty or filled with a liquid to be agitated.

It is also an object to provide improved agitating and stirring means which will more thoroughly mix the liquid in the freezing pan and prevent crystllization thereof.

Other objects and features of the invention will more fully appear from the following detailed description, taken in connection with the accompanying drawings, which illustrate a single embodiment thereof, and in which:

Figure 1 is a fragmentary view illustrating a typical mechanical refrigerator, with its door open to show the position of the invention therein;

Figure 2 is an enlarged elevational view, showing the invention applied to the usual freezing pan or ice tray;

Figure 3 is a transverse sectional view through the driving motor mounting, taken substantially on the line III—III of Figure 2;

Figure 4 is a sectional view through the device, showing the details of the driving motor shaft and the shaft of the agitators, taken substantially on the line IV—IV of Figure 3;

Figure 5 is an underside view of the cover for the ice pan or freezing tray, showing the details of the mounting of the agitators;

Figure 6 is a transverse sectional view through the freezing pan with the cover applied thereto, taken substantially on the line VI—VI of Figure 2; and Figure 7 is a fragmentary sectional view, showing the details of the connection between the agitator shaft and its drive, taken substantially on the line VII—VII of Figure 3.

As shown on the drawings:

In the drawings, Figure 1 illustrates a typical mechanical refrigerator 10 having the usual freezing element 11 which is equipped with freezing pans or ice trays as shown at 12. Ordinarily the ice trays or freezing pans 12 are inserted in the freezing compartment, the pans being provided with a separator element, so that when the liquid in the pan freezes, it will be in the form of cubes.

The present invention seeks to provide a mechanism which may be connected to the customary ice tray or freezing pan as usually furnished with mechanical refrigerators, for agitating a liquid therein during the freezing operation, with the result that the liquid will be prevented from crystallizing during the freezing operation. In the present invention, it is unnecessary to have specially designed freezing pans or ice trays, since the entire mechanism is supported on a cover which is adapted to fit the customary tray.

A cover 13 is arranged to fit the top of the tray, and be clamped thereon. The usual ice tray or freezing pan is provided with outwardly turned lateral edges 14 and 15. One side of the cover 13 is extended and folded to form a longitudinally extending groove 16 which is adapted to receive the lateral edge 14 of the pan. The other side of the cover is provided with a plurality of spring clips 17 which are adapted to resiliently engage the lateral edge 15 of the pan and permit swinging movement of the cover to disengage the same when the clips are disengaged from the associated pan edge.

On the underside of the cover there is supported a pair of parallel extending rotatable shafts 18 and 19 which are supported at their respective ends for rotational movement by means of bearing brackets 20 and 21, these brackets being supported from the cover as by screws 22 or other appropriate means. The shafts 18 and 19, respectively, are provided with spirally extending blades 23 and 24. It will be observed that these blades are spiralled in opposite directions so that if the blades are rotated in the same direction, the liquid in one side of the pan will be moved in an opposite direction from that at the other side of the pan. In addition to causing a circulation of the liquid in the pan, the blades also operate to stir and agitate the liquid.

The shafts 18 and 19 are removably connected to main driving sprockets 25 and 26 which are disposed within a gear housing 27. This gear housing is formed to define two compartments, a compartment 28 which is arranged to extend below the plane of the cover 13 into the freezing pan, and an upper compartment 29 which extends above the plane of the cover.

Referring to Figures 4 and 7, it will be observed that the upper compartment 29 is of greater thickness than the lower compartment 28, so that at their juncture, offset end portions 30 and 31 will be formed.

The associated end of the cover 13 is provided with a rectangular shaped end notch 32 which is adapted to receive therein the lowermost portion 28 of the housing, the bottom or inner edge of the notch 33 abutting the surface of the inner end of the lower portion of the housing 28. The cover is secured to the underside of the offset portion 31, as by screws 34. The offset portion 30 together with the marginal end portions 35 and 36 of the cover will engage a rim flange 37 at the associated end of the pan. A similar flange 38 is also formed at the opposite end of the pan, and it is found desirable to upwardly deflect these rim portions to define abutment edges 39 to prevent longitudinal movement of the cover with the housing 28 relative to the pan.

The main driving sprockets 25 and 26 are rotatably supported in spaced relationship within the lower portion 28 of the housing, by means of a rotatable shaft 40, one end of this shaft being supported in a bearing 41, and the other end of the shaft 40 being supported in the opposite wall of the housing. This latter end of the shaft is provided with an end flange 41ª disposed outside the housing wall and adapted to bear against a packing member 42. The flange 41ª is tightened against the packing member by means of an adjusting nut 43 which is disposed on the interior of the housing and in threaded engagement with the shaft. With this arrangement, the nut 43 may be tightened sufficiently to compress the packing 42 and prevent leakage, but at the same time not cause such a tight connection that the shaft 40 cannot be easily rotated.

This end of the shaft 40 is provided with an end socket 44 of square cross-section, this socket being adapted to receive therein the squared end 45 of one of the shafts 18 or 19, as the case may be. It will therefore be evident that by removing the screws 34, the cover with the agitator supported thereon may be removed as a unit from the housing 27 to facilitate cleaning of the agitating mechanism. Moreover, with this arrangement, it is not necessary, when cleaning the agitating mechanism, to subject the motor and driving connections to abnormal moisture conditions which might attend the cleaning operation, with the result that the possibility of damaging the motor windings is reduced to a minimum.

The main driving sprockets 25 and 26 are actuated in the same direction by means of a chain 46 which is trained thereover and is driven by a driving sprocket 47 in the upper portion of the housing 29. Within the upper portion 29 of the housing, there is arranged a pair of spaced bearing brackets or plates 48', and 49', which serve to support the shafts of a train of speed reducing gears which interconnect the main driving sprocket 47 with a driving gear 48 on the drive shaft 49 of the motor. Of course, the train of speed reducing gears may be of any desired ratio, depending upon the speed of the driving motor which is used. However, the motor speed should be reduced to drive the agitating blades at the most suitable speed.

The driving motor, which is indicated at 50, is of the usual construction and is supported from the upper compartment 29 of the housing. It will be noted in this connection that the motor does not project below the lower surface of the freezing pan, thus enabling the pan to be placed on a flat surface, such as a table. Also, due to the fact that the weight of the cover and the gear mechanism is more than sufficient to counterbalance the weight of the motor, the center of gravity of the parts associated with the cover will be so disposed as to come within the periphery of the freezing pan. There will therefore be no tendency of the device to tip or tilt either when it is empty or filled with a liquid to be frozen.

In order to prevent liquid in the pan from being forced out of the pan between the pan edge 15 and the associated marginal edge of the cover, there is provided a baffle 51 which is inwardly spaced from the edge of the cover and secured thereto so as to extend longitudinally thereof.

From the foregoing description, it will be apparent that the present invention provides an improved attachment for the freezing pan or ice tray of a mechanical refrigerator, whereby the liquid to be frozen may be agitated and stirred during the freezing operation; a device which may be readily attached to and detached from the usual freezing pan; which enables the freezing pan to be used for its ordinary purpose of freezing ice cubes, if desired; a device having its parts so arranged that they do not project below the bottom of the freezing pan, whereby the pan may be supported on a flat surface when the agitating mechanism is attached thereto; which has the center of gravity so disposed that it will not tip or tilt the pan, when empty, and in which the agitating blades and cover from which the blades are supported may be removed as a unit from the motor and driving connections, thus enabling cleaning and washing of the agitating blades and cover without subjecting the motor parts to possible damage by water or other liquid.

Now, of course, it is to be understood that while the invention is illustrated and described in detail in its preferred form, the invention is not to be thus limited, but only insofar as defined by the scope and spirit of the appended claims.

We claim as our invention:

1. An accessory for a refrigerator comprising means arranged to be removably secured to the refrigerator freezing pan, whereby a liquid in the pan may be agitated and stirred, said means including a cover for said pan, a pair of horizontally disposed and longitudinally extending parallel shafts rotatably mounted on the cover and spaced from the undersurface of the cover, motor means for rotating said shafts in the same direction, oppositely spiralled blades carried by said shafts, whereby a liquid in the freezing pan will be simultaneously stirred and moved longitudinally of the pan in opposite directions at its sides, said blades, shafts, and cover forming a unit assembly, and means removably connecting said power means to said shafts, whereby said unit assembly may be removed relative to said power means.

2. In a device of the character described, an elongated pan adapted for insertion into a freezing compartment of a refrigerator, a cover for said pan, agitator means supported on said cover arranged to be disposed in said pan, when the cover is placed thereon, a housing at one end of the cover extending above and below the cover, the portion below being shaped to fit into said pan and the portion above shaped to form a vertical abutment, a motor supported on said housing, and a driving connection between said motor and agitator means including gears in said housing.

3. In a device of the character described, an elongated pan adapted for insertion into a freezing compartment of a refrigerator, a cover for said pan, agitator means supported on said cover arranged to be disposed in said pan, when the cover is placed thereon, a housing at one end of the cover extending above and below the cover, the portion below being shaped to fit into said pan and the portion above to form a vertical abutment, a motor supported on and outside said housing, gears in said housing driven by said motor, and detachable connections between the cover and housing, and between the agitating means and said gears, whereby the agitating means and cover may be disconnected as a unit.

CARL A. KLENK.
BESSIE S. FRENCH.